US008046535B2

(12) United States Patent
Shibayama et al.

(10) Patent No.: US 8,046,535 B2
(45) Date of Patent: Oct. 25, 2011

(54) DATA PROCESSING SYSTEM AND STORAGE AREA ALLOCATION METHOD THEREOF

(75) Inventors: Tsukasa Shibayama, Kawasaki (JP); Daisuke Shinohara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 634 days.

(21) Appl. No.: 12/153,351

(22) Filed: May 16, 2008

(65) Prior Publication Data

US 2009/0240867 A1 Sep. 24, 2009

(30) Foreign Application Priority Data

Mar. 19, 2008 (JP) ................................ 2008-072311

(51) Int. Cl.
*G06F 12/00* (2006.01)
(52) U.S. Cl. ....................................... 711/114; 711/100
(58) Field of Classification Search .................. 711/100, 711/114
See application file for complete search history.

(56) References Cited

U.S. PATENT DOCUMENTS

| 2004/0225662 | A1 | 11/2004 | Nojima |
| 2005/0091455 | A1 | 4/2005 | Kano et al. |
| 2007/0055713 | A1 | 3/2007 | Nagai et al. |
| 2007/0168598 | A1* | 7/2007 | Yamamoto et al. ........... 711/100 |

FOREIGN PATENT DOCUMENTS

| JP | 2003-015915 | 7/2001 |
| JP | 2004-334561 | 5/2003 |
| JP | 2005-011277 | 6/2003 |
| JP | 2007-066259 | 9/2005 |

* cited by examiner

*Primary Examiner* — Jasmine Song
(74) *Attorney, Agent, or Firm* — Stites & Harbison PLLC; Juan Carlos A. Marquez, Esq.

(57) ABSTRACT

When creating a storage pool with external volumes, it is not possible to put together the volumes that have the same level of reliability if consideration is only given to the physical attributes of such volumes. Further, the reliability demanded between a host computer and a storage apparatus does not necessarily match the reliability between storage apparatuses. When creating a storage pool in the data processing system of this invention, not only is consideration given to the characteristics of the physical disks themselves, consideration is also given to the connection status of the backend network between a storage apparatus and a switch loaded with external storage function, and an external storage apparatus. What is more, volumes are allocated to a host machine after said system considers both the redundancy of a backend network of between storage apparatuses and that of a network path between the host machine and storage apparatus.

20 Claims, 17 Drawing Sheets

FIG.2

| 2240 | 2241 | 2242 | 2243 | 2244 | 2245 | 2246 | 2247 |
|---|---|---|---|---|---|---|---|
| APPARATUS ID | VOLUME ID | EXTERNALLY CONNECTED APPARATUS ID | EXTERNAL LUN | APPARATUS VENDOR | DISK TYPE | Network Distance | ALTERNATE PATH COUNT |
| Storage1 | 0 | Storage2 | 0 | COMPANY A | FC | 0 | 4 |
| Storage1 | 1 | Storage2 | 2 | COMPANY A | FC | 0 | 4 |
| Storage1 | 2 | Storage3 | 0 | COMPANY B | FC | 1 | 2 |
| Storage1 | 3 | Storage3 | 1 | COMPANY B | SATA | 2 | 2 |

FIG.3

| 2250 | 2251 | 2252 | | |
|---|---|---|---|---|
| APPARATUS ID | POOL ID | RESTRICTION ITEMS | | |
| | | 1 | 2 | 3 |
| Storage1 | 0 | RESTRICTION ITEMS | DiskType =SATA | ST VENDOR = COMPANY A |
| | 1 | THREE OR LESS ALTERNATE PATHS | EXTENSION OF APPARATUS ACROSS DIFFERENT VENDORS | - |

FIG.4

| APPARATUS ID | POOL ID | GROUP ID | GROUP ADOPTION FLAG | VOLUME ID | PRIORITY | CAPACITY | ALLOCATED FLAG |
|---|---|---|---|---|---|---|---|
| Storage1 | 0 | 0 | 1 | 1 | 1 | 300GB | 1 |
| | | | | 2 | 2 | 200GB | 1 |
| | | | | 4 | 3 | 500GB | 0 |
| | | 1 | 0 | 11 | 1 | 500GB | 0 |
| | | | | 12 | 2 | 300GB | 0 |
| | | 2 | 0 | 20 | 1 | 500GB | 0 |

| INTERNAL POOL ID 3230c | THRESHOLD VALUE 3231 | POOL ALLOCATED VOLUME ID 3232 | VOLUME CAPACITY 3233 | USED AMOUNT 3234 | ALTERNATE PATH 3235 |
|---|---|---|---|---|---|
| 0 | 80% | 1 | 300GB | 100GB | 3 |
| | | 2 | 500GB | 100GB | 3 |
| 1 | 80% | 0 | 500GB | 50GB | 1 |

FIG.17

| VOLUME ID 3250 | INTERNAL POOL ID 3251 |
|---|---|
| 0 | 0 |
| 1 | 0 |
| 2 | 0 |
| 3 | 1 |

DATA PROCESSING SYSTEM AND STORAGE AREA ALLOCATION METHOD THEREOF

CROSS-REFERENCES

This application relates to and claims priority from Japanese Patent Application No. 2008-072311, filed on Mar. 19, 2008, the entire disclosure of which is incorporated herein by reference.

BACKGROUND

The present invention generally relates to a data processing system and its storage area allocation method, and in particular can be suitably applied to a data processing system and its storage area allocation method that allocates a storage area of an externally connected storage apparatus.

In recent years, the amount of data used by corporations and individuals has increased drastically. Thus, storage systems using technology such as SAN (Storage Area Network) and NAS (Network Attached Storage) that enable flexible data management by connecting storage apparatuses and host computers via a switch or a hub are being used extensively.

When allocating a storage area (hereinafter referred to as a "volume") of a storage apparatus to be used by a host computer from the storage apparatus to the host computer under a SAN environment, there is standard technology for putting together a plurality of volumes into a group (this group is hereinafter referred to as a "storage pool" and a volume registered in the storage pool is referred to as a "pool volume"), and allocating a volume having the capacity requested by the host computer from the storage pool. Further, in order to make the volume allocation to the host computer more efficiently and easily, technology is disclosed for creating a storage pool by classifying the storage areas based on the demand characteristics, required performance and reliability of each application from the attributes of the physical disk itself, and presenting the candidate of the storage pool to be used to the user (refer to Japanese Patent Laid-Open Publication No. 2004-334561).

Meanwhile, as technology for reducing the management cost of storage apparatuses, technology referred to as thin provisioning is disclosed for allocating a virtual volume (hereinafter referred to as a "virtual volume") to a host computer, and allocating the actual storage area according to the I/O from the host computer to the virtual volume (refer to Japanese Patent Laid-Open Publication No. 2003-15915).

When using this technology, the administrator of the storage apparatus registers in advance one or more storage areas in a logical group referred to as a thin provisioning pool (this is hereinafter referred to as a "TP pool" and a volume registered in the TP pool is also referred to as a "pool volume"). Here, the administrator sets a threshold value for warning the capacity depletion of the TP pool. The administrator thereafter creates a virtual volume, and associates it with the TP pool and the host computer.

When data is written from the host computer into the virtual volume, the written data is actually stored in the storage area of the pool volume. When the capacity that is actually being used by the TP pool approaches the threshold value as a result of data being written into the virtual volume, the management server warns the administrator. Based on this warning, the administrator takes measures such as adding a physical disk to the storage apparatus.

In a case where volumes having different attributes such as the disk type or RAID level coexist in the TP pool, in order to guarantee the reliability of the virtual volume used by the host computer, disclosed is technology that continues to store data in a volume having the same property as the pool volume to which the data was first written (refer to Japanese Patent Laid-Open Publication No. 2007-66259).

In addition, there is technology for treating a plurality of storage apparatuses as though they are a single storage apparatus for the purpose of unifying the connection relation between a host computer and a storage apparatus, or using a high capacity storage resource (such as a cache memory) in an inexpensive storage apparatus. This is disclosed as technology (hereinafter referred to as the "external storage function") which enables the use of a volume of a separate storage apparatus as the external storage area of the self-storage apparatus (refer to Japanese Patent Laid-Open Publication No. 2005-011277). When using this technology, the storage apparatus loaded with the external storage function and the storage apparatus to be used as the external storage area are connected via a network.

SUMMARY

When using the externally connected volume of Japanese Patent Laid-Open Publication No. 2005-011277 as the pool volume of a storage pool, even if the storage pool is created with the technology of Japanese Patent Laid-Open Publication No. 2004-334561, sufficient classification cannot be made regarding the reliability of volumes. This is because, if consideration is given only to the characteristics of the external physical disk itself, the reliability of the externally connected volume will change depending on the backend network configuration between the storage apparatus loaded with the external storage function and the external storage apparatus.

In addition, when using an externally connected volume in a TP pool, even if data is written in a disk having the same property by using the technology of Japanese Patent Laid-Open Publication No. 2003-15915 and Japanese Patent Laid-Open Publication No. 2007-66259, if a single externally connected volume becomes unavailable due to a backend switch failure or the like, the TP pool itself also becomes unavailable.

Moreover, although the externally connected volumes in the storage apparatus loaded with the external storage function are able to respectively create a plurality of paths to the volumes of the external storage apparatus, the number of such paths will not necessarily match the number of paths between the host computer and the storage apparatus loaded with the external storage function, and, in certain cases, the reliability demanded by the administer between the host computer and the volumes of the storage apparatus may not be satisfied depending on the redundancy (path count) between the storage apparatus loaded with the external storage function and the externally connected volumes.

The present invention was devised in view of the foregoing points. Thus, an object of the present invention is to propose a storage system and its externally connected volume allocation method capable of putting together volumes having the same level of reliability upon creating a storage pool with externally connected volumes, and allocating the externally connected volumes while maintaining the reliability demanded between the host computer and the storage apparatus.

In order to achieve the foregoing object, the present invention provides a data processing system comprising a first storage apparatus, a second storage apparatus that uses the first storage apparatus as an external storage area, at least one or more host computers, at least one or more switches for connecting the first storage apparatus, the second storage apparatus, and the host computer, and a management server for managing the first storage apparatus, the second storage apparatus, and the switches. The first storage apparatus includes one or more physical devices, and a first storage area configured from the one or more physical devices. The second storage apparatus includes one or more physical devices, an external device management unit that sets the first storage area as an external storage area and uses the external storage area as a virtual device, and a storage pool configured from a second storage area configured from the one or more physical devices and the first storage area. The data processing system further comprises a creation unit for determining the reliability of the second storage area based on connection information between the first storage area and the second storage area, classifying the first and the second storage areas based on the reliability, and creating the storage pool in the second storage apparatus, and a provision unit for creating a path between the host computer and the second storage apparatus so as to guarantee the same level of reliability as the reliability of the respective storage pools, and providing the second storage area to the host computer.

Specifically, when creating a storage pool in the data processing system of this invention, not only is consideration given to the characteristics of the physical disks themselves, consideration is also given to the connection status of the backend network between a storage apparatus loaded with external storage function and a switch, and an external storage apparatus. In other words, the minimum number of switches (hereinafter referred to as the "network distance") interposed between the externally connected volumes and the volumes of the external storage apparatus to be mapped to the externally connected volumes as well as the number of paths between the respective volumes obtained from the connection information among the external connection ports (hereinafter referred to as the "external ports") and the switch ports of the storage apparatus loaded with the external storage function, and the target ports of the external storage apparatus (hereinafter referred to as the "target ports") are considered as parameters upon creating a storage pool.

In addition, if there are a plurality of paths between the externally connected volumes and the volumes of the external storage apparatus to be mapped to the externally connected volumes, the management server commands the administrator to also create a plurality of paths between the host computer, which is to use such externally connected volumes as its storage area, and the storage apparatus upon allocating the volumes. If the path between the host computer and the storage apparatus is redundant, the administrator is commanded to allocate volumes from a storage pool configured from the externally connected volumes having a redundant backend network.

As a result of creating the storage pool upon giving consideration to the backend network as described above and allocating volumes upon giving consideration to the redundancy (path count) between the host computer and the storage apparatus as well as between the storage apparatus loaded with the external storage function and the external storage apparatus, volumes having the same level of reliability can be put together upon creating a storage pool with the externally connected volumes, and the externally connected volumes can be allocated while maintaining the reliability demanded between the host computer and the storage apparatus.

According to the present invention, volumes having the same level of reliability can be compiled upon creating a storage pool with the externally connected volumes, and the externally connected volumes can be allocated while maintaining the reliability demanded between the host computer and the storage apparatus.

DESCRIPTION OF DRAWINGS

FIG. 2 is a diagram showing an example of a volume management table according to the first embodiment;

FIG. 3 is a diagram showing an example of a pool reference table according to the first embodiment;

FIG. 4 is a diagram showing an example of a volume group management table according to the first embodiment;

FIG. 16 is a diagram showing the threshold value management table added with an switching path according to the third embodiment;

FIG. 17 is a diagram showing a table of correspondence volume and internal pool according to the third embodiment;

DETAILED DESCRIPTION

The respective embodiments of the present invention are now explained with reference to the attached drawings. These embodiments, however, are not intended to limit the present invention in any way.

First Embodiment

Figure 1:
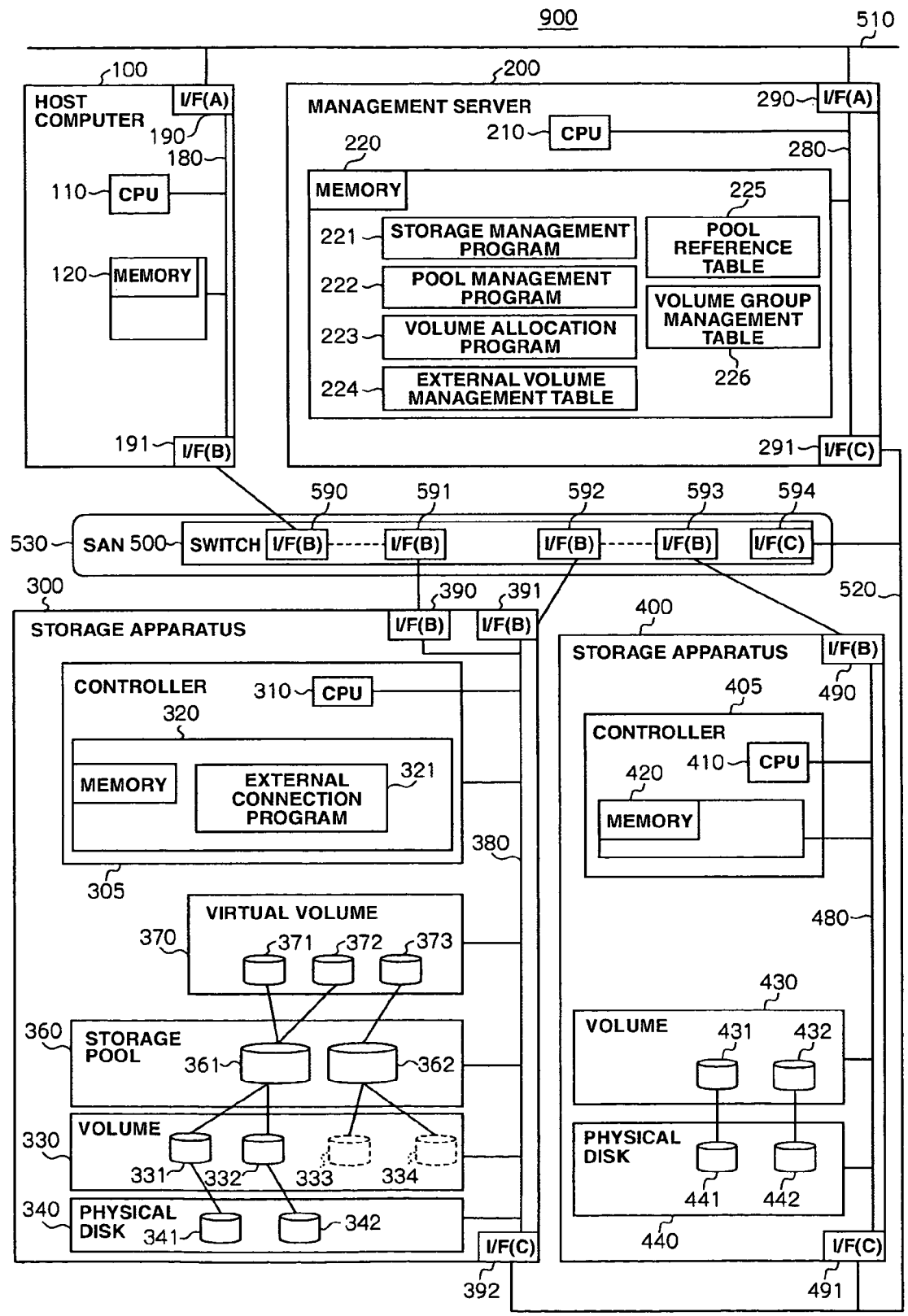
FIG. 1 is a diagram showing the configuration of a data processing system according to the first embodiment of the present invention.

FIG. 1 is an explanatory diagram showing the configuration of a data processing system applying the present invention. The data processing system 900 comprises a host computer 100, a management server 200, a storage apparatus 300 loaded with an external storage function, a storage apparatus 400, and a switch 500. Although the first embodiment explains a case where the data processing system 900 comprises one host computer 100, the configuration may also include a plurality of host computers.

The host computer 100 and the management server 200 are connected via a LAN (Local Area Network) 510. The host computer 100 and the storage apparatuses 300, 400 are connected via the switch 500 in a SAN (Storage Area Network) 530. The host computer 100 and the storage apparatuses 300, 400 may also be connected directly without going through the switch 500. The management server 200 and the storage apparatuses 300, 400 and the switch 500 are connected via a management network 520.

The host computer 100 comprises a CPU (Central Processing Unit) 110, a memory 120, an interface (network interface) (A) 190 for connecting to the LAN 510, and an interface (B) 191 for connecting to the SAN 530. The CPU 110, the memory 120, the interface (A) 190 and the interface (B) 191 are mutually connected via a bus 180.

Functions of the host computer 100 are realized by the CPU 110 executing prescribed programs. The memory 120 stores programs and data to be used by the CPU 110. The memory 120 includes a program for accessing the volume 330 provided from the storage apparatus 300, but this program may be a general program for accessing volumes. This program is not illustrated in the diagrams since it is a general program.

In addition to the configuration depicted in FIG. 1, the host computer 100 also comprises an input device for the user to input data and an output device for presenting information to the user of the host computer 100. Nevertheless, since these components are not directly related to the present invention, they are not illustrated in the diagrams.

The management server 200 comprises a CPU 210, a memory 220, an interface (A) 290 for connecting to the LAN 510, and an interface (C) 291 for connecting to the management network 520. The CPU 210, the memory 220, the interface (A) 290 and the interface (C) 291 are mutually connected via a bus 280.

Functions of the management server 200 are realized by the CPU 210 executing prescribed programs. The memory 220 stores programs and data to be used by the CPU 210. The programs stored in the memory 220 include, in addition to the general program for executing the management function of the management server 200, a storage management program 221, a pool management program 222, and a volume allocation program 223. Data stored in the memory 220 include, in addition to the general data for executing the management function of the management server 200, an external volume management table 224, a pool reference table 225, and a volume group management table 226.

The storage management program 221 is a program to be executed by the CPU 210, and performs the processing for managing the storage apparatuses 300, 400 and the switch 500.

The pool management program 222 is a program to be executed by the CPU 210, and performs the processing for creating a storage pool in the storage apparatus 300.

The volume allocation program 223 is a program to be executed by the CPU 210, and creates a path between the volumes (including virtual volumes) in the storage apparatus 300 and the host computer 100.

The external volume management table 224, the pool reference table 225 and the volume group management table 226 will be described later.

In addition to the configuration depicted in FIG. 1, the management server 200 also comprises an input device for the user to input data and an output device for presenting information to the user of the host computer 100. Nevertheless, since these components are not directly related to the present invention, they are not illustrated in the diagrams.

The storage apparatus 300 comprises a controller 305, a volume 330, a physical disk 340, a storage pool 360, a virtual volume 370, an interface (B) 390 for connecting to the host computer, an interface (B) 391 (external port) for connecting to the external storage apparatus 400, and an interface (C) 392 for connecting to the management network 520.

Although the interfaces (B) 390, 391 are respectively connected to the interfaces (B) 591, 592 in the switch 500 in FIG. 1, they do not necessarily have to go through the switch 500, and may be directly connected to the interface (B) 191 of the host computer 100 and the interface (B) 490 (target port) of the storage apparatus 400, respectively.

Here, the volume 330 is a logical storage area configured from a physical resource provided by one or more physical disks 340. Although four volumes 330 (volumes 331, 332, 333, 334) are shown in FIG. 1, the present invention is not limited to this configuration, and it would suffice so as long as there are one or more volumes. In addition, although two physical disks 340 (physical disks 341, 342) are shown in FIG. 1, the present invention is not limited to this configuration, and it would suffice so as long as there are 0 or more physical disks. In FIG. 1, although the volumes 331, 332 are configured from the physical disks 341, 342 and the volumes 333, 334 correspond to the volumes 431, 432 of the external storage apparatus 400, the present invention is not limited to this configuration, and the relationship between the volume 330 and the physical disk 340 and volume 430 will suffice so as long as it is a one or more-to-one or more relationship.

The storage pool 360 represents a group configured from one or more volumes 330. Although two storage pools 360 (storage pool 361, storage pool 362) are shown in FIG. 1, the present invention is not limited to this configuration, and it would suffice so as long as there are one or more storage pools. In FIG. 1, although the storage pool 361 is configured from the volumes 331, 332 and the storage pool 362 is configured from the volumes 333, 334, the present invention is not limited to this configuration, and the relationship between the storage pool and the volumes will suffice so as long as it is a one-to-one or more relationship.

The virtual volume 370 represents a virtual storage area. The virtual volume 370 is allocated to the host computer 100, and is accessed by the host computer 100 for writing and reading data. Nevertheless, the virtual volume 370 does not have an actual storage area, and the write access from the host computer 100 to the virtual volume 370 is transmitted to the volume 330 configuring the storage pool via the storage pool associated with the virtual volume 370, and the data written by the host computer 100 is stored in the volume 330. Similarly, the read access from the host computer 100 to the virtual volume 370 is transmitted to the volume 330 configuring the pool 360 via the pool 360 associated with the virtual volume 370, and the data to be read by the host computer 100 is read from the volume 330. Although three virtual volumes (virtual volumes 371, 372, 373) are shown in FIG. 1, the present invention is not limited to this configuration, and it will suffice so as long as there are one or more virtual volumes. In FIG. 1, although the virtual volumes 371, 372 are associated with the pool 361 and the virtual volume 373 is associated with the storage pool 362, the present invention is not limited to this configuration, and the relationship between the virtual volumes and the storage pool will suffice so as long as it is a one or more-to-one relationship.

The controller 305 comprises a CPU 310 and a memory 320. The CPU 310 and the memory 320 are mutually connected via a bus 380. The memory 320 stores programs and data to be used by the CPU 310. The memory 320 includes an external connection program 321 in addition to a general program for functioning as a storage apparatus.

The external connection program 321 is a program to be executed by the CPU 310, and maps the volume 430 in the storage apparatus 400 of the external destination, and the volume 330. The CPU 310 is able to realize the external storage function for using the storage apparatus 400 as an external storage apparatus by executing the external connection program 231.

In addition to the configuration depicted in FIG. 1, the storage apparatus 300 also comprises an input device for the user to input data and an output device for presenting information to the user of the host computer 100. Nevertheless, since these components are not directly related to the present invention, they are not illustrated in the diagrams.

The storage apparatus 400 comprises a controller 405, a volume 430, a physical disk 440, an interface (B) 490 (target port) for connecting to the storage apparatus loaded with the external storage function, and an interface (C) 491 for connecting to the management network 520.

In FIG. 1, although the interface (B) 490 is connected to the interface (B) 593 of the switch 500 in the SAN 530, it does not necessarily have to pass through the switch 500, and may be directly connected to the interface (B) 391 of the storage apparatus 300.

In FIG. 1, although the volumes 431, 432 respectively correspond to the physical disks 441, 442, the present invention is not limited to this configuration, and the relationship of the volume 430 and the physical disks 440 will suffice so as long as it is a one-to-one or more relationship. In addition, although only one storage apparatus 400 of the external destination is illustrated in FIG. 1, there may be a plurality of such storage apparatuses 400.

The switch 500 comprises interfaces (B) 590, 591, 592, 593 for connecting to the host computer 100 and the storage apparatuses 300, 400, and an interface (C) 594 for connecting to the management network 520. In the present invention, it will suffice so as long as there are one or more interfaces (B) and one or more interfaces (C). Moreover, in FIG. 1, although only one switch 500 is illustrated in the SAN 530, there may be a plurality of such switches 500.

The external volume management table 224, the pool reference table 225 and the volume group management table 226 are now explained with reference to FIG. 2 to FIG. 4.

The external volume management table 224 is foremost explained. FIG. 2 is a diagram showing an example of the external volume management table 224.

As shown in FIG. 2, the external volume management table 224 is configured from an apparatus ID column 2240, a volume ID column 2241, an externally connected apparatus ID column 2242, an external LUN (Logical Unit Number) column 2243, an apparatus vendor column 2244, a disk type column 2245, a network distance column 2246, and an switching path count column 2247.

The apparatus ID column 2240 stores the apparatus ID for identifying the storage apparatus 300 providing the volume 330. The volume ID column 2241 stores the identification number of the volume 330. The externally connected apparatus ID column 2242 stores the externally connected apparatus ID for identifying the external storage apparatus. The external LUN column 2243 stores the LUN ID for identifying volumes in the external storage apparatus. The apparatus vendor column 2244 stores information showing the vendor that manufactured the storage apparatus. The disk type column 2245 stores information showing the type of disk configuring the volume 430 in the external storage apparatus. The network distance column 2246 stores information showing the distance of the network between the volume 300 in the storage apparatus loaded with the external storage function and the volume 430 in the external storage apparatus. The switching path count column 2247 stores information showing the number of paths between the volume 330 in the storage apparatus loaded with the external storage function and the volume 430 in the external storage apparatus.

However, the information stored in the apparatus ID column 2240 and the volume ID column 2241 is not limited to the expressions used in FIG. 2, and any kind of information will suffice so as long as the information is able to uniquely identify the storage apparatus 300 and the volume 330, respectively. Similarly, the information stored in the externally connected apparatus ID column 2242 and the external LUN column 2243 is not limited to the expressions used in FIG. 2, and any kind of information will suffice so as long as the information is able to uniquely identify the storage apparatus 400 and the volume 430, respectively.

The external volume management table 224 stores, for example, "Storage 1" as the apparatus ID, "0" as the volume ID, "Storage 2" as the externally connected apparatus ID, "0" as the external LUN, "Company A" as the apparatus vendor, "FC (Fibre Channel)" as the disk type, "0" as the network distance, and "4" as the switching path count.

The pool reference table 225 is now explained. FIG. 3 is a diagram showing an example of the pool reference table 225.

The pool reference table 225, as shown in FIG. 3, is configured from an apparatus ID column 2250, a pool ID column 2251 and a constraint item column 2252.

The apparatus ID column 2250 stores the apparatus ID for identifying the storage apparatus retaining the storage pool 360. The pool ID column 2251 stores the pool ID as information that identifies the pool ID for identifying the storage pool 360. The constraint item column 2252 stores information showing the constraint items for setting conditions of volumes to be excluded from the pool upon creating the storage pool. The constraint items to be set in the constraint item column 2252 are presented from the management server 200 to the administrator, and a value can be set for each storage pool. The constraint items, as shown in FIG. 3 for instance, are set with "no switching path," "disk type=SATA," "ST Vendor (storage vendor)=Company A," "three or less switching paths," "extension of apparatus across different vendors" and so on. As the conditions indicated in the constraint items, in addition to one constraint item, a plurality of constraint items may be set to one pool ID. In addition to the conditions indicated in FIG. 3, the constraint items may set any type of condition so as long as it is an identification condition that can be recognized by the management server 200.

The pool reference table 225 stores, for example, "Storage 1" as the apparatus ID, "0" as the pool ID, and "no switching path," "disk type=SATA," and "ST Vendor (storage vendor)= Company A" as the constraint items.

The volume group management table 226 is now explained. FIG. 4 is a diagram showing an example of the volume group management table 226.

The volume group management table 226 is configured from an apparatus ID column 2260, a pool ID column 2261, a group ID column 2262, a group adoption flag column 2263, a volume ID column 2264, a priority column 2265, a capacity column 2266, and an allocated flag [column] 2267.

The apparatus ID column 2260 stores the apparatus ID for identifying the storage apparatus retaining the storage pool 360. The pool ID column 2261 stores the pool ID as information that identifies the pool ID for identifying the storage pool 360. The group ID column 2262 stores the group ID as the ID for identifying the group of the volume groups classified according to the conditions of the pool reference table 225. The group adoption flag column 2263 stores the group adoption flag showing that the volume group is being used by the storage pool 360. The volume ID column 2264 stores the volume ID as information for identifying the volumes contained in the volume group. The priority column 2265 stores information showing the level of reliability. The capacity column 2266 stores information showing the capacity of the volume. The allocated flag column 2267 stores information showing that the volume group has already been allocated to the host computer 100.

In FIG. 4, although the group adoption flag to be stored in the group adoption flag column 2263 and the allocated flag to be stored in the allocated flag column 2267 are set to "1" if true and "0" if false, the present invention is not necessarily limited to this configuration.

The volume group management table 226 stores, for example, "Storage 1" as the apparatus ID, "0" as the pool ID, "0" as the group ID, "1" as the group adoption flag, "1" as the volume ID, "1" as the priority, "300GB" as the capacity, and "1" as the allocated flag.

Figure 5:
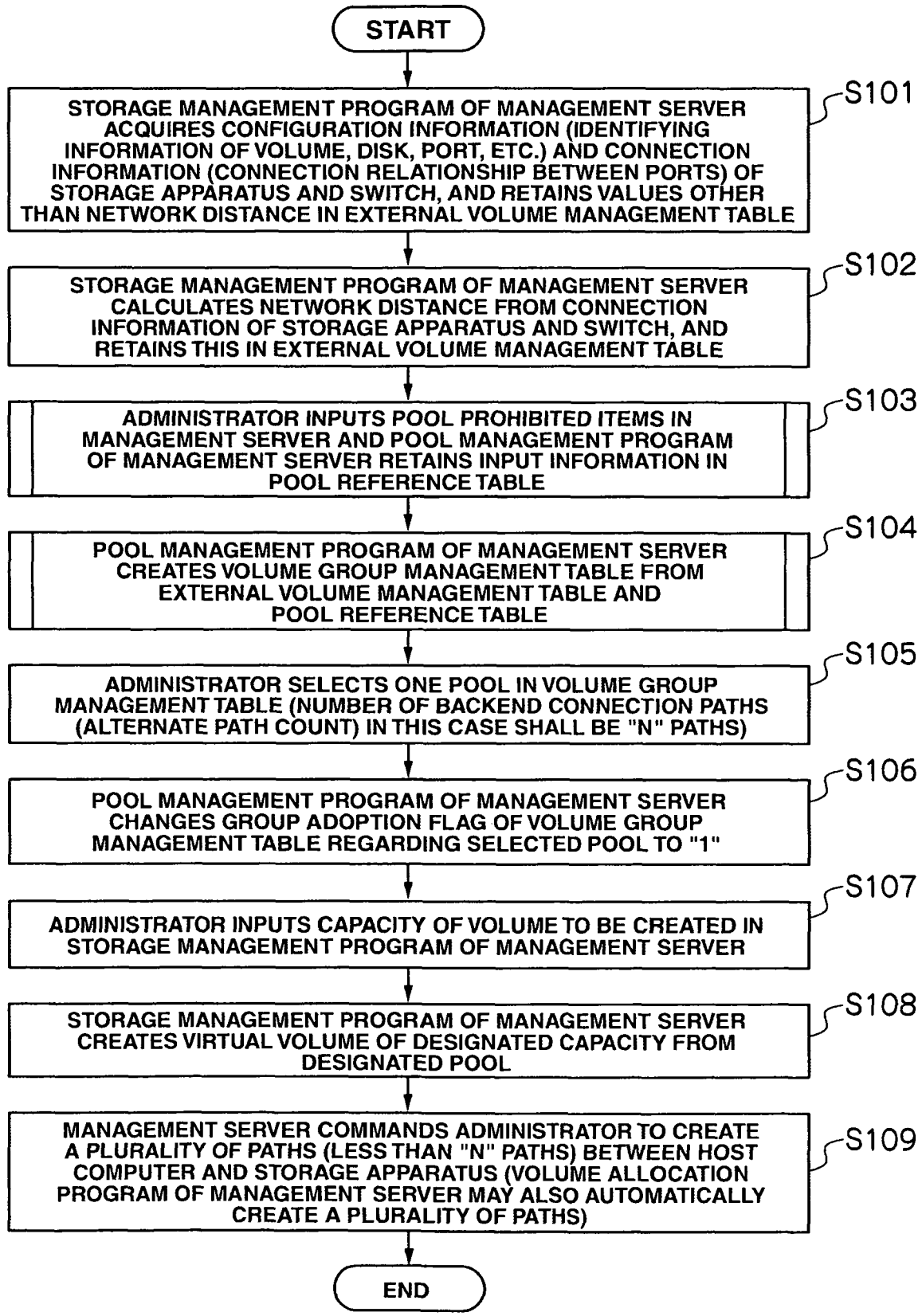
FIG. 5 is a diagram showing the outline of the processing sequence to be performed among the respective apparatuses according to the first embodiment.
Figure 6:
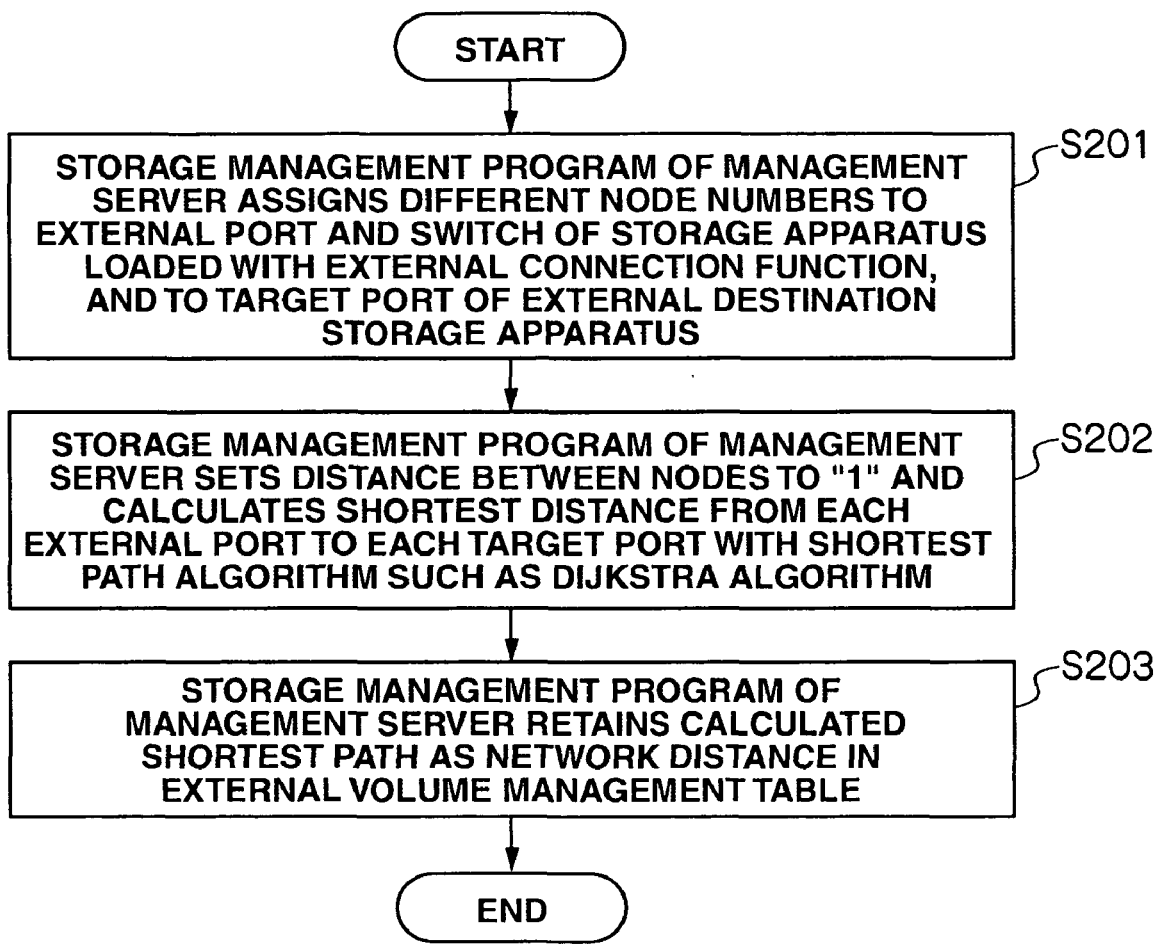
FIG. 6 is a diagram showing an example of the processing for calculating the network distance upon creating an external volume management table according to the first embodiment.
Figure 7:
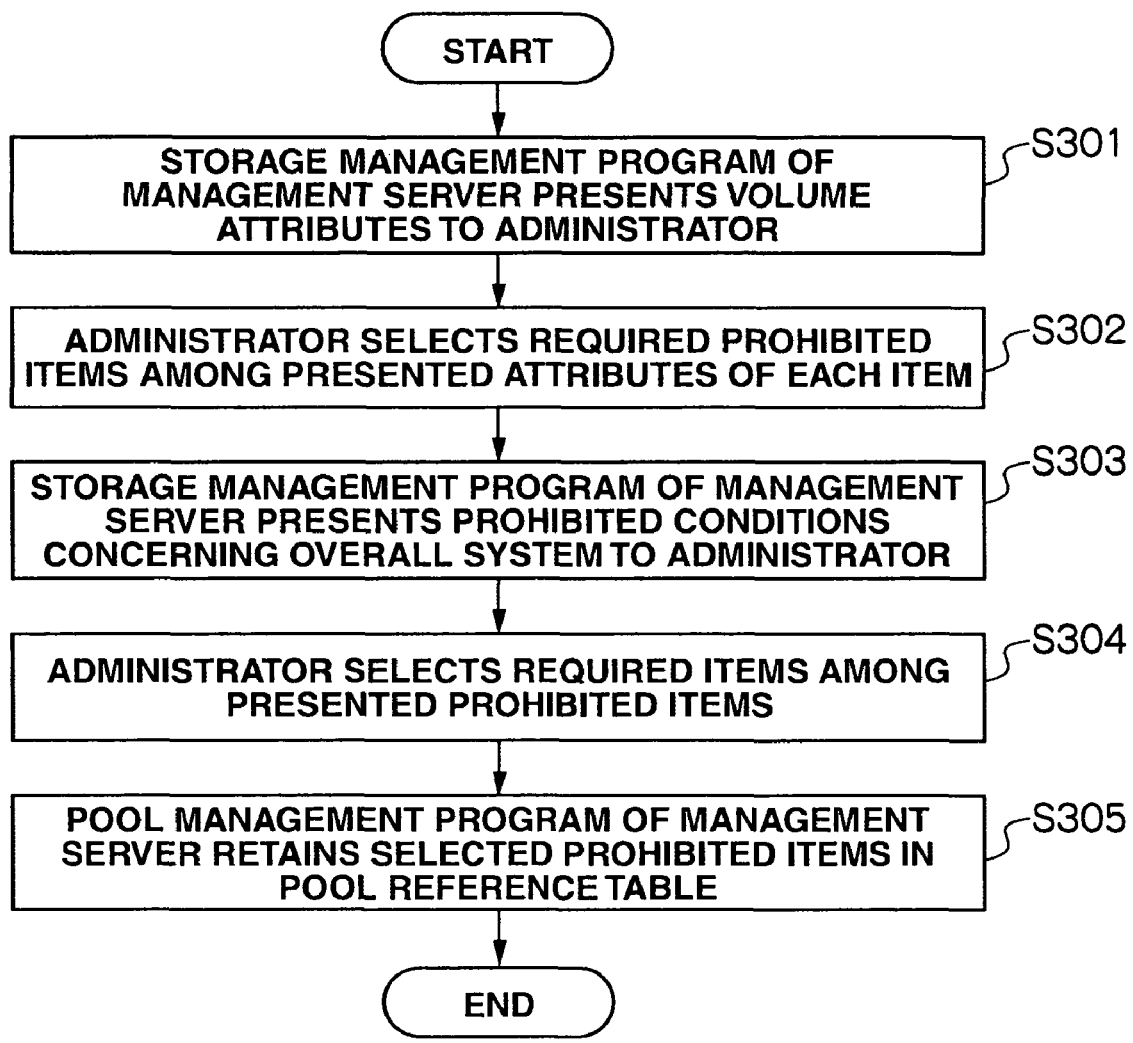
FIG. 7 is a diagram showing an example of the processing for creating a pool reference table according to the first embodiment.
Figure 8:
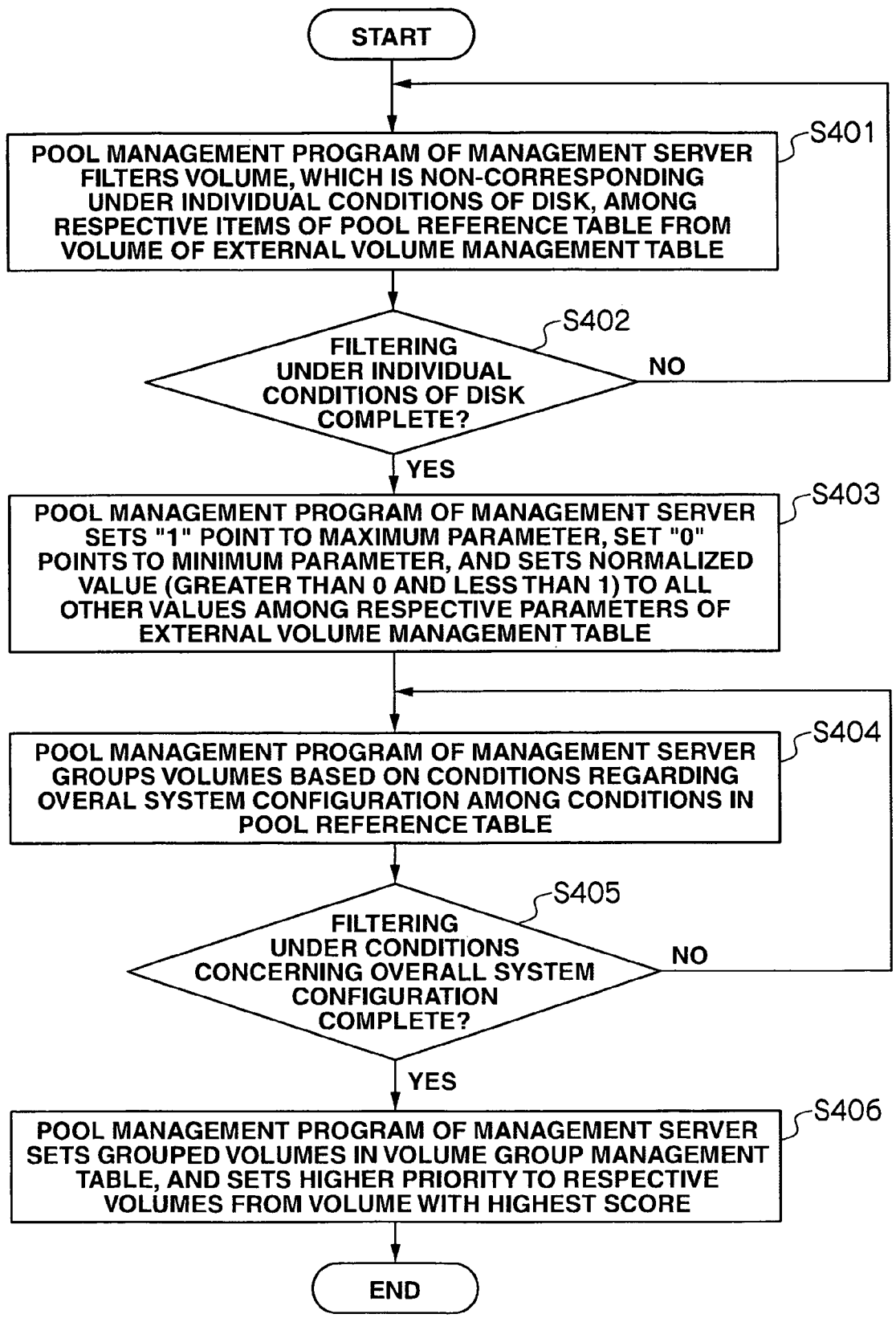
FIG. 8 is a diagram showing an example of the processing for creating a volume group management table according to the first embodiment.

Data processing in the data processing system 900 configured as described above is now explained. FIG. 5 is a flowchart showing the overall processing of this data processing, and FIG. 6 to FIG. 8 are sub-flowcharts of the respective steps S102, S103, and S104 in FIG. 5.

As shown in FIG. 5, foremost, at step S101, the storage management program 221 of the management server 200 acquires the configuration information (identifying information of the volumes 330, 370, 430, disks 340, 440, ports 390, 490, 590, etc.) and the connection information (connection relationship among respective ports 390, 490, 590) of the storage apparatuses 300, 400 and the switch 500, and retains values other than the network distance in the external volume management table 224.

At step S102, the storage management program 221 calculates the network distance from the connection information of the storage apparatuses 300, 400 and the switch 500, and retains such network distance in the external volume management table 224. Details regarding the processing at step S102 will be explained later with reference to the sub-flowchart of FIG. 6.

At step S103, the administrator inputs the constraint items of the storage pool in the management server 200, the pool management program 222 of the management server 200 retains the input information in the pool reference table 225. Details regarding the processing at step S103 will be explained later with reference to the sub-flowchart of FIG. 7.

At step S104, the pool management program 222 of the management server 200 creates the volume group management table 226 from the external volume management table 224 and the pool reference table 225. Details regarding the processing at step S104 will be explained later with reference to the sub-flowchart of FIG. 8.

At step S105, the administrator selects one storage pool 360 (group ID 2262) in the volume group management table 226 (here, the number of backend connection paths (switching path count) shall be "N" paths).

At step S106, the pool management program 222 of the management server 200 changes the group adoption flag 2263 of the volume group management table 226 of the selected storage pool 360 to "1."

At step S107, the administrator inputs the capacity of the volume to be created in the storage management program 221 of the management server 200.

At step S108, the storage management program 221 of the management server 200 creates a volume of the capacity designated at step S107 from the designated storage pool.

At step S109, the management server 200 commands the administrator to create a plurality of paths (less than "N" paths) between the host computer 100 and the storage apparatus 300. Instead of commanding the administrator, the volume allocation program of the management server 200 may also automatically create a plurality of paths.

The respective processes at steps S102, S103, and S104 are now explained.

FIG. 6 is a sub-flowchart showing the details of the processing at step S102. At step S201, the storage management program 221 of the management server 200 assigns different node numbers to the external port 391 of the storage apparatus 300, the switch ports 592, 593, and the target port 490 of the external storage apparatus 400.

At step S202, the storage management program 221 of the management server 200 sets the distance between the respective nodes to "1," and calculates the shortest distance from the respective external ports 391 to the respective target ports 490 based on the shortest path algorithm (the "Dijkstra" algorithm is used in this example).

At step S203, the storage management program 221 of the management server 200 retains the calculated shortest distance as the network distance 2246 in the external volume management table 224. If the distance between the respective nodes in the "Dijkstra" algorithm is set to "1," the minimum value of the shortest distance will be "1." Nevertheless, since the network distance represents the number of switches between the volumes 330, 430, the value obtained by subtracting 1 from the value calculated with the "Dijkstra" algorithm will become the value of the network distance. Details regarding the processing at step S102 are as described above.

FIG. 7 shows a sub-flowchart showing the details of the processing at step S103.

Foremost, at step S301, the storage management program 221 of the management server 200 presents the individual attributes of the volume 330 to the administrator. For instance, the storage management program 221 presents a conditions where, in the case of the type of disk, SATA (Serial Advanced Technology Attachment) will not be used as a storage pool volume.

At step S302, the administrator selects the required constraint items among the presented attributes of the respective items.

At step S303, the storage management program 221 of the management server 200 presents the restrictive condition of the overall system configuration to the administrator. For example, a restrictive condition indicating that a storage pool that extends across different storage apparatuses will not be created is presented to the administrator.

At step S304, the administrator selects the required items among the presented constraint items.

At step S305, the pool management program 222 of the management server 200 retains the selected constraint items in the pool reference table 225. Details regarding the processing at step S103 will be described later.

FIG. 8 is a sub-flowchart showing the details of the processing at step S104.

At step S401, the pool management program 222 of the management server 200 filters volumes, which are non-corresponding under individual attributes of disks, among the respective items of the pool reference table 225 from the volumes of the external volume management table 224.

If the filtering under the individual attributes of disks is complete at step S402, the routine proceeds to the processing at step S403. If a filtering condition still remains, the routine returns to the processing at step S401.

At step S403, the pool management program 222 of the management server 200 sets 1 point to the maximum parameter and 0 points to the minimum parameter among the respective parameters of the external volume management table 224, and sets a normalized value (greater than 0 and less than 1) to all other values in order to score the respective volumes.

At step S404, the pool management program 222 of the management server 200 groups the volumes based on the conditions concerning the overall configuration of the data processing system 900 among the conditions in the pool reference table 225.

At step S405, if the filtering based on the conditions concerning the overall configuration is complete, the routine proceeds to step S406. If a filtering condition still remains, the routine returns to step S404.

At step S406, the pool management program 222 of the management server 200 sets the grouped volumes in the volume group management table 226. Higher priority is given to the respective volumes from the volume with the highest score. Although a smaller number is given for a higher priority in FIG. 4, the present invention is not limited to this configuration. Details regarding the processing at step S104 are as described above.

As described above, the data processing system 900 is able to configure a storage pool while giving consideration to the network distance and the connection configuration of the backend network such as the switching path, and additionally perform volume allocation while giving consideration to the number of paths among the host computer 100, the storage apparatus 300 loaded with the external storage function, and the external storage apparatus 400. Thereby, the data processing system 900 is capable of compiling volumes having the same level of reliability upon creating a storage pool with externally connected volumes, and allocating the externally connected volumes while maintaining the reliability demanded between the host computer and the storage apparatus.

Modified Example of First Embodiment

A modified example of the first embodiment is now explained. The difference in configuration between this modified example and the first embodiment is that, in substitute for the storage apparatus 300 loaded with the external storage function and the switch 500, a virtualization apparatus loaded with the functions of both these apparatuses is used in the data processing system 900.

Figure 9:
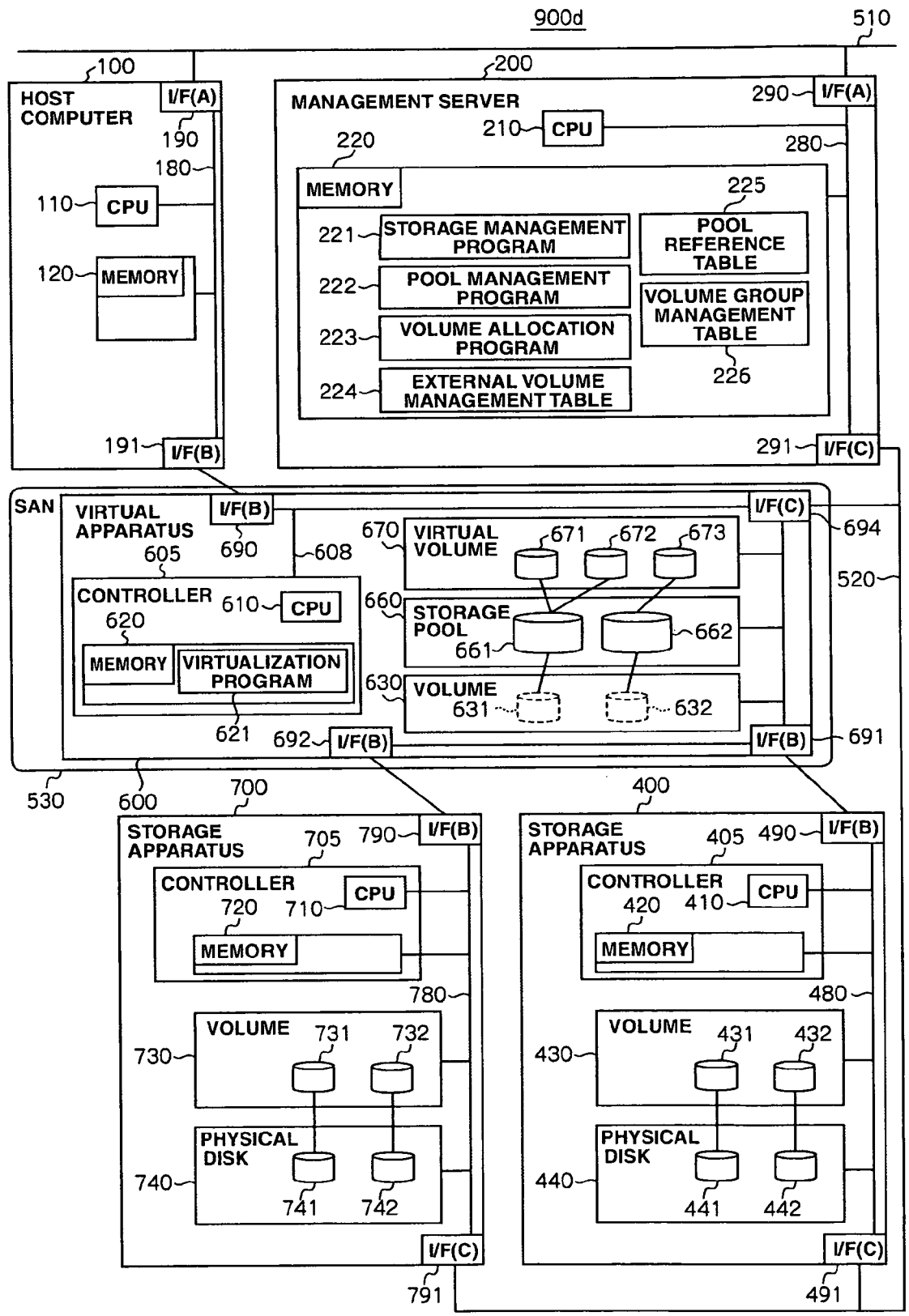
FIG. 9 is a diagram showing a configuration of a data processing system according to a modified example of the first embodiment of the present invention.

FIG. 9 is a diagram showing the configuration of a data processing system 900d using the virtualization apparatus. As shown in FIG. 9, the data processing system 900d comprises a virtualization apparatus 600 in substitute for the storage apparatus 300 and the switch 500. Since the remaining configuration other than the use of the virtualization apparatus 600 and the storage apparatus 700 is the same as the configuration illustrated in FIG. 1, the same reference numeral is assigned to the same component, and the detailed explanation of the configuration other than the configuration of the virtualization apparatus 600 is omitted.

The storage apparatus 700 comprises a controller 705, a volume 730 (731, 732), a physical disk 740 (741, 742), an interface (B) 790 for connecting to the virtualization apparatus, and an interface (C) 791 for connecting to the management network 520.

The virtualization apparatus 600 comprises a controller 605, a volume 630, a storage pool 660, a virtual volume 670, an interface (B) 690 for connecting to the host computer 100, interfaces (B) (external ports) 691, 692 for connecting to the external storage apparatuses 400, 700, and an interface (C) 694 for connecting to the management network 520.

The controller 605 comprises a CPU 610 and a memory 620. The CPU 610 and the memory 620 are connected via a bus 680. The memory 620 stores programs and data to be used by the CPU 610. Specifically, the memory 620 stores a virtualization program 621.

The virtualization program 621 is a program to be executed by the CPU 610, and maps the volumes 430, 730 in the external storage apparatuses 400, 700 with the volume 630. The host computer 100 is able to use the volumes 430, 730 by the CPU 610 executing the virtualization program 621.

The difference between the data processing system 900d configured as described above and the data processing system 900 of the first embodiment is in that the apparatus to use the volume 430 in the external storage apparatus 400 has been changed from the storage apparatus 300 loaded with the external storage function to the virtualization apparatus 600. Thus, the processing to be performed by the data processing system 900d is the same as the processing performed by the data processing system 900; that is, it is the same as the processing explained with reference to FIG. 5 to FIG. 8.

Like this, the data processing system 900d using the virtualization apparatus 600 is also able to yield the same effect as the data processing system 900.

Second Embodiment

Figure 10:
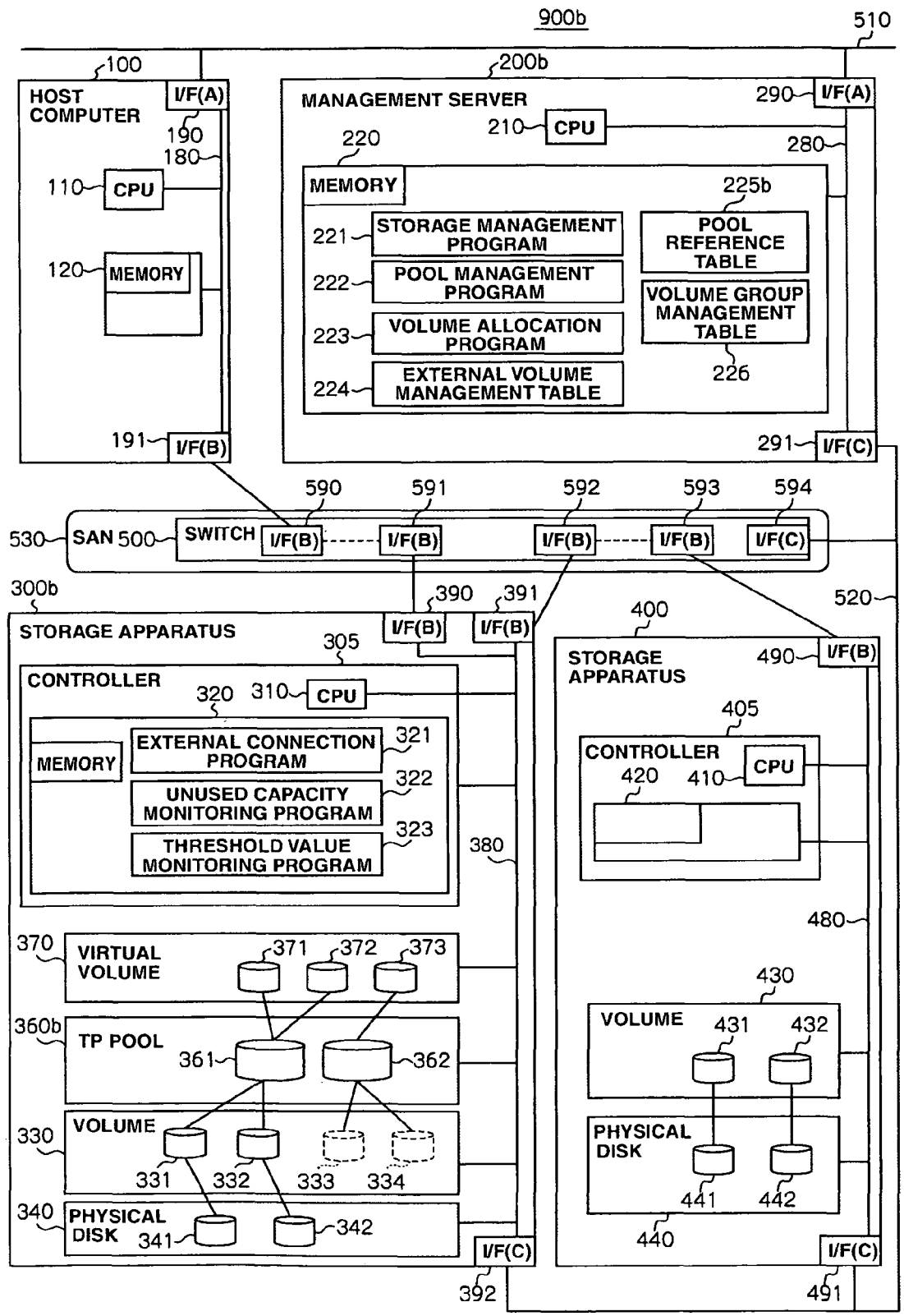
FIG. 10 is a diagram showing a system configuration according to the second embodiment of the present invention.

The second embodiment is now explained. FIG. 10 is a diagram showing the configuration of a data processing system according to the second embodiment. The data processing system 900b comprises one or more host computers 100, a management server 200b, a storage apparatus 300b loaded with an external storage function, a storage apparatus 400, and a switch 500. Most of the configuration of the data processing system 900b is the same as the first embodiment, and the same reference numeral is assigned to the same component. The differences in configuration are explained in detail below.

What differs from the data processing system 900 shown in FIG. 1 is that the management server 200b comprises a pool reference table 225b, and the storage apparatus 300b is storing an unused capacity monitoring program 322, a threshold value monitoring table 323, and a TP pool 360b in the memory 320.

Figure 11:
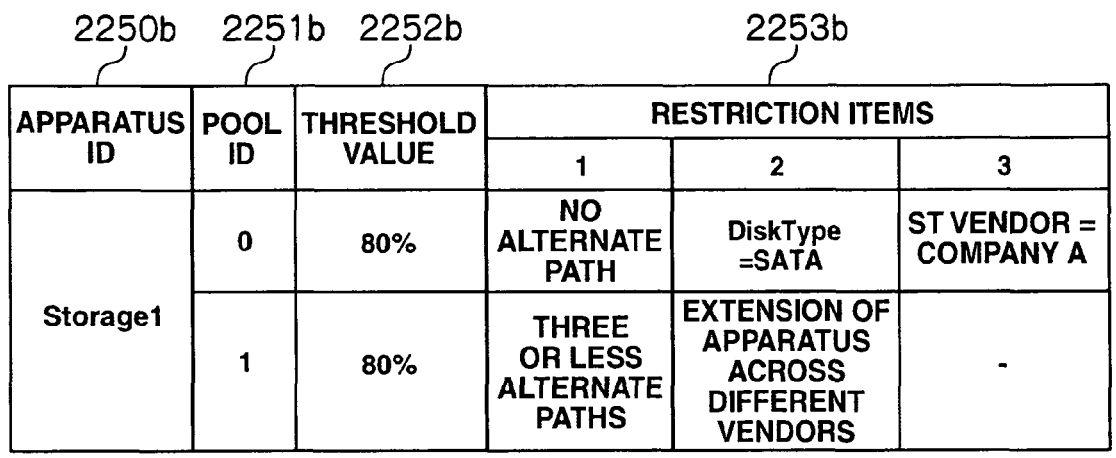
FIG. 11 is a diagram showing an example of a threshold value monitoring table according to the second embodiment.

FIG. 11 is a diagram showing the pool reference table 225b. The pool reference table 225b is configured from the respective items storing an apparatus ID column 2250b, a pool ID column 2251b, a threshold value column 2252b, and a constraint item column 2253b.

The apparatus ID column 2250b stores the apparatus ID for identifying the storage apparatus retaining the TP pool 360b. The pool ID column 2251b stores the pool ID for identifying the TP pool 360b. The threshold value column 2252b stores the threshold value to be used as a reference upon adding a volume when the unused capacity of the TP pool becomes depleted. The constraint item 2253b stores the constraint items for setting the conditions of volumes to be excluded from the TP pool upon creating the TP pool. As with the constraint item 2252 of the pool reference table 225 in the first embodiment, the items to be set in the constraint item 2253b are presented from the management server 200 to the administrator, and the value can be set for each storage pool. A plurality of conditions can be set in the constraint item 2253b. In addition to the conditions indicated in FIG. 11, the constraint item 2253b may set any type of condition so as long as it is an identification condition that can be recognized by the management server 200.

The unused capacity monitoring program 322 is a program to be executed by the CPU 310, and is used for monitoring the unused capacity of the TP pool and sending a warning to the storage management program 221 of the management server 200b when the unused capacity is depleted.

Figure 12:
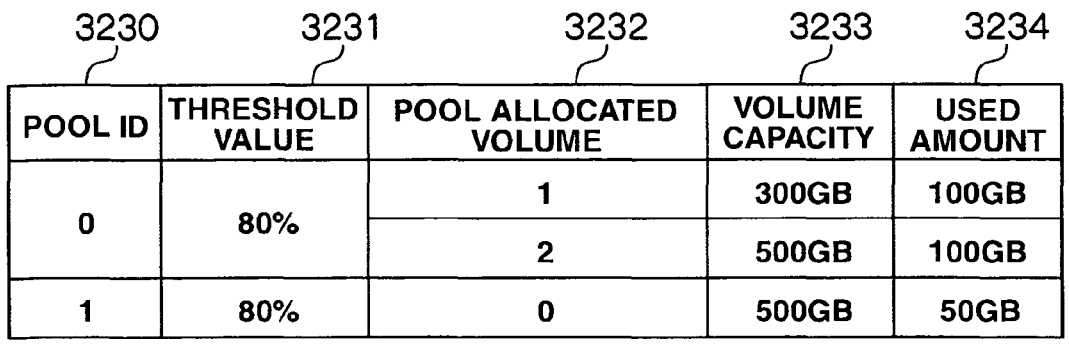
FIG. 12 is a diagram showing the outline of the TP pool creation and path allocation processing according to the second embodiment.

FIG. 12 is a diagram showing the threshold value management table 323. As shown in FIG. 12, the threshold value management table 323 is configured from a pool ID column 3230, a threshold value column 3231, a pool allocated volume ID column 3232, a volume capacity column 3233, and a utilization column 3234.

The pool ID column 3230 stores the pool ID for identifying the TP pool. The threshold value 3231 column stores the threshold value to be used as a reference upon adding a volume to the TP pool when the unused capacity of the TP pool is depleted. The pool allocated volume ID column 3232 stores the pool allocated volume ID for identifying the volume that was allocated to the TP pool and being used. The volume capacity column 3233 stores the volume capacity showing the capacity of the respective volumes. The utilization column 3234 stores the utilization of the respective volumes.

The TP pool 360b is a pool for allocating a storage area to the thin provisioning virtual volume 370, and configured from the volume 330. The TP pool 360b may also be configured from a volume configured from the physical disk 340 retained in the storage apparatus 300, or configured from a volume externally connected to a volume retained in the external storage apparatus 400.

The processing to be executed in the data processing system 900b is now explained. Since the processing to be executed in the data processing system 900b is for the most part the same as the processing to be executed in the data processing system 900 of the first embodiment, only the sections where different processing is to be performed are explained.

With the data processing system 900b, among the processing steps to be executed in the data processing system 900, the processing where the administrator sets the pool condition and the processing where the management server creates a volume from the pool designated by the administrator are changed, and the processing of delivering the TP pool threshold value from the management server 200 to the storage apparatus and the processing of the storage apparatus creating a threshold value management table are added. In addition, with the data processing system 900b, the processing of allocating a volume to the TP pool is added to the processing after the creation of the TP pool and the allocation of the volume to the host is complete.

Figure 13:
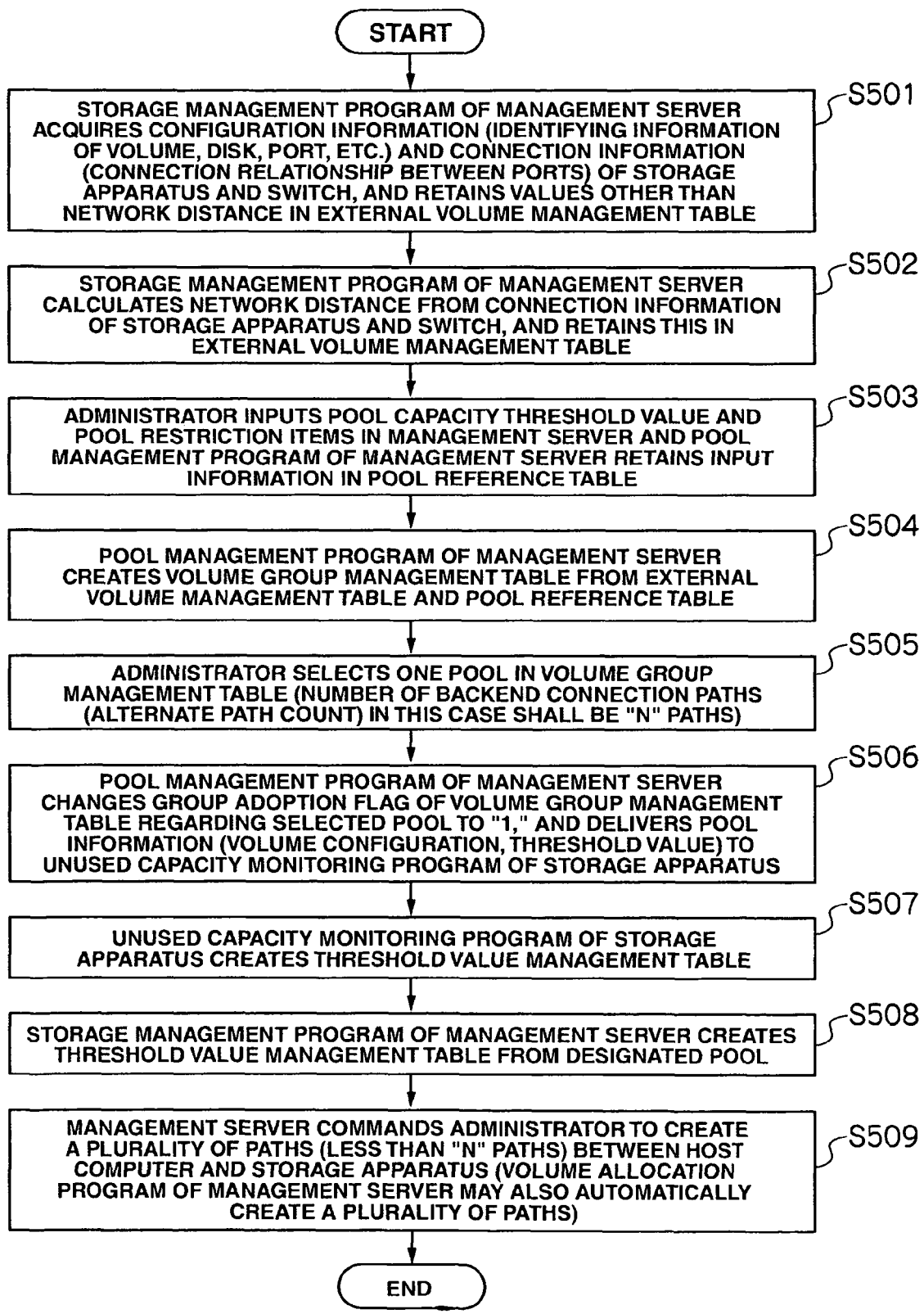
FIG. 13 is a diagram showing the outline of the TP pool creation and path allocation processing according to the second embodiment.
Figure 14:
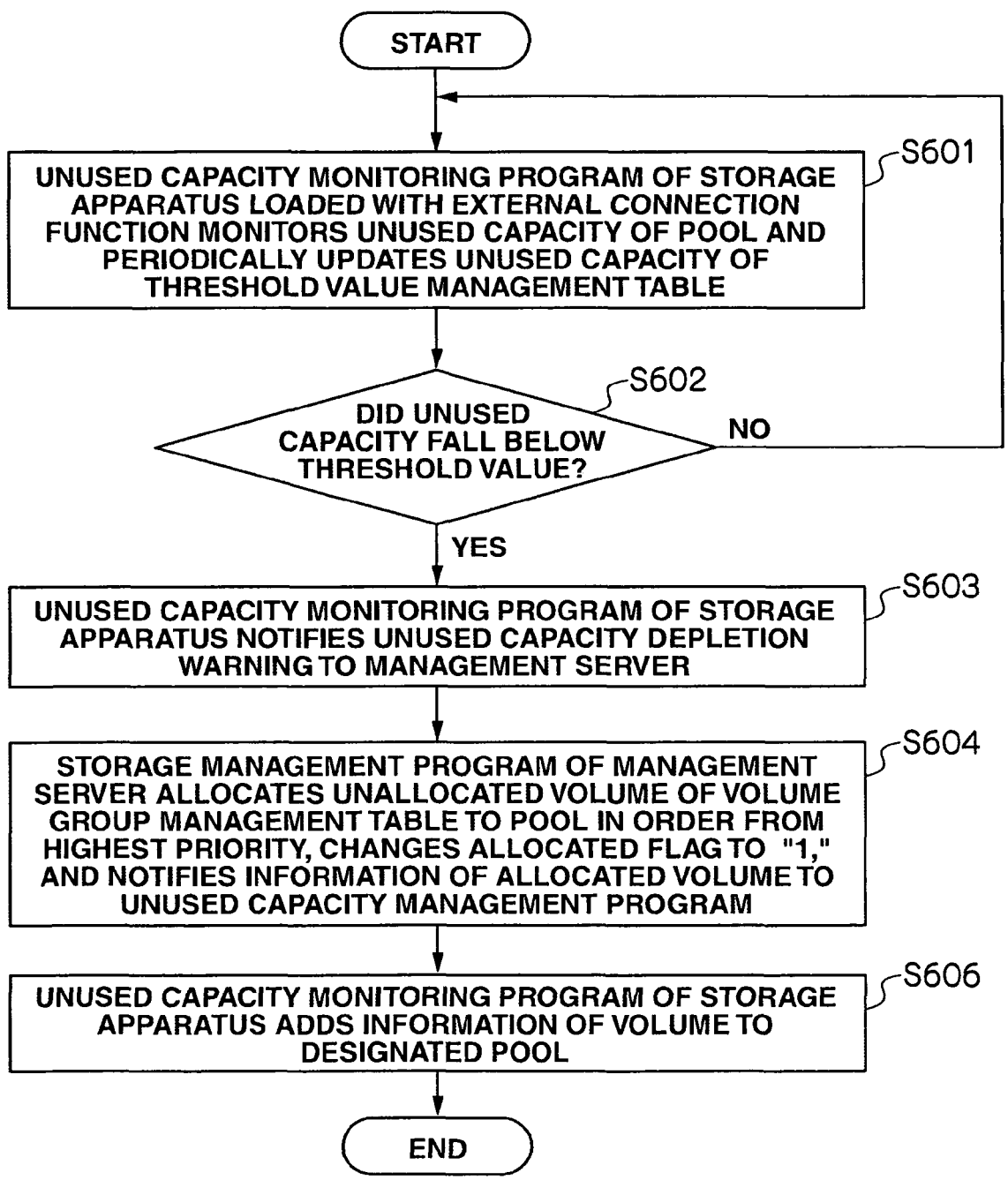
FIG. 14 is a diagram showing an example of the processing for allocating a volume to the TP pool according to the second embodiment.

The processing to be executed in the data processing system 900b is now explained in detail with reference to FIG. 13 and FIG. 14. FIG. 13 is a flowchart showing the outline of the TP pool creation and path allocation processing in the second embodiment.

Since the processing at steps S501, S502 is each the same as the processing at steps S101, S102 of the first embodiment, the explanation thereof is omitted.

Although only the administrator set the constraint items at step S103 of the first embodiment, the processing of setting the threshold value for receiving a warning from the storage apparatus 300 during the depletion of the unused capacity of the TP pool is added to the processing at step S503. Like this, the threshold value of the pool capacity and the constraint items input by the administrator are retained in the pool reference table 225b.

Since the processing at steps S504, S505 is each the same as the processing at steps S104, S105 of the first embodiment, the explanation thereof is omitted.

At step S506, in addition to the processing at step S106 of the first embodiment, the processing of delivering the information (volume configuration and threshold value) of the adopted TP pool from the pool management program 222 of the management server 200 to the unused capacity monitoring program 322 of the storage apparatus 300 is added.

At step S507, the unused capacity monitoring program 322 of the storage apparatus 300 creates the threshold value management table 323 from the information received at step S506.

At step S508, the storage management program 221 of the management server 200 creates a virtual volume from the designated TP pool.

Since the processing at step S509 is the same as the processing at step S109 of the first embodiment, the explanation thereof is omitted.

The processing of allocating the volume to the TP pool after the operation thereof has started subsequent to the creation of the TP pool and the allocation of the volume 370 to the host computer 100 being completed is now explained. FIG. 14 is a flowchart showing the volume allocation processing to the TP pool of the second embodiment.

At step S601, the unused capacity monitoring program 322 of the storage apparatus 300 monitors the unused capacity of the pool. The unused capacity monitoring program 322 also periodically updates the unused capacity of the threshold value management table 323.

If the unused capacity monitoring program 322 of the storage apparatus 300 detects that the unused capacity fell below the threshold value as a result of monitoring the unused capacity at step S602, it proceeds to the processing of step S603. If the unused capacity is greater than the threshold value, the unused capacity monitoring program 322 of the storage apparatus 300 returns to the processing of step S601.

At step S603, the unused capacity monitoring program 322 of the storage apparatus 300 notifies the unused capacity depletion warning to the storage management program 221 of the management server 200.

At step S604, the storage management program 221 of the management server 200 allocates the unallocated volumes of the volume group management table 226 to the TP pool in order from the highest priority, changes the allocated flag 2267 to "1," and notifies the information of the allocated volume to the unused capacity management program 322 of the storage apparatus 300.

At step S605, the unused capacity monitoring program 322 of the storage apparatus 300 adds the information of the volume of the TP pool designated in the threshold value monitoring table 323.

As a result of the foregoing processing, the storage system 900b is able to create a TP pool and allocate volumes to the host computer upon giving consideration to the backend connection configuration and redundancy upon allocating an externally connected volume to the TP pool.

Third Embodiment

Figure 15:
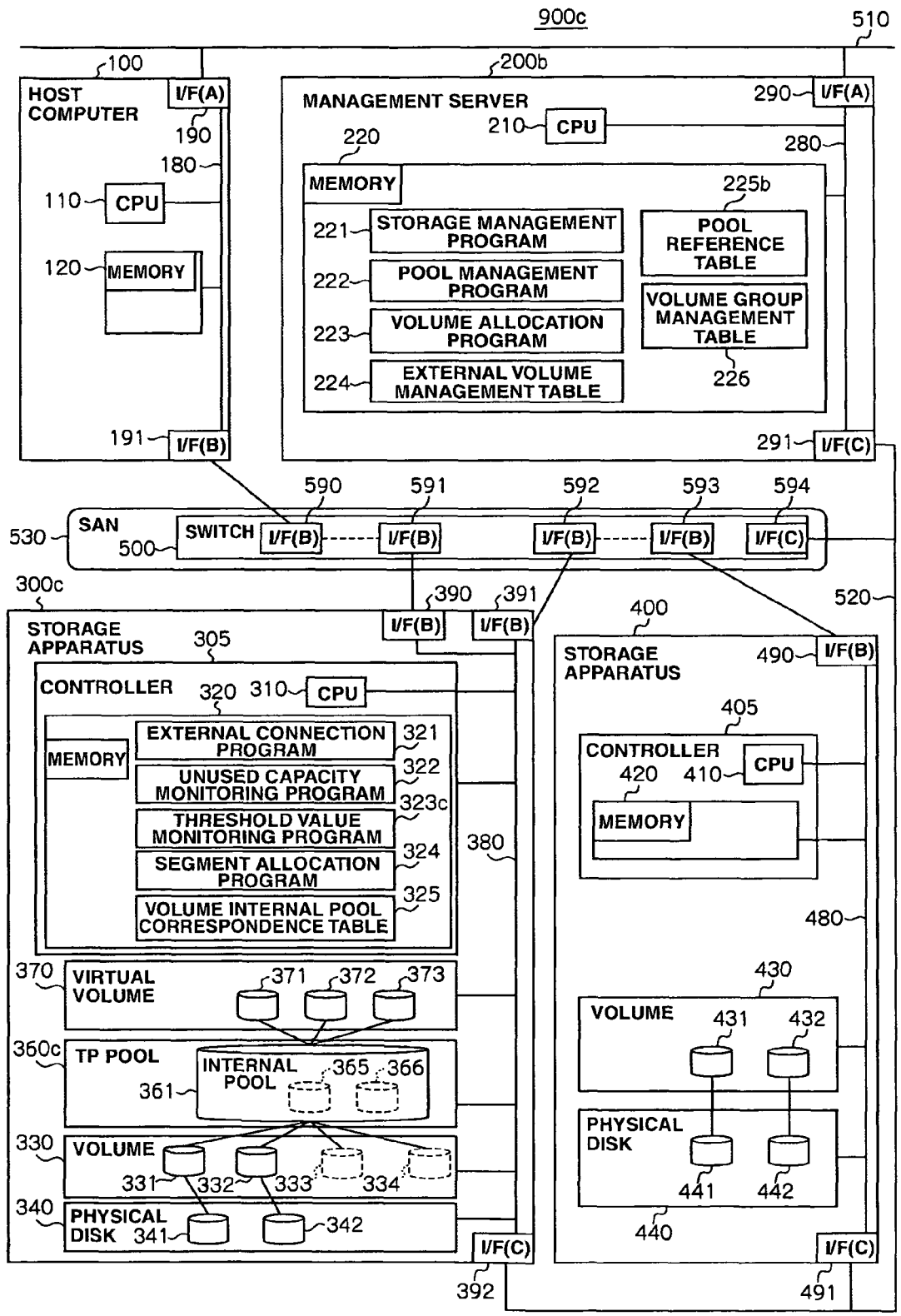
FIG. 15 is a diagram showing the configuration of a data processing system according to the third embodiment of the present invention.

The third embodiment is now explained. FIG. 15 is an explanatory diagram showing the configuration of a data processing system according to the third embodiment.

The data processing system 900c comprises one or more host computers 100, a management server 200b, a storage apparatus 300c loaded with an external storage function, a storage apparatus 400, and a switch 500. Most of the configuration of the data processing system 900c is the same as the second embodiment, and the same reference numeral is assigned to the same component. The differences in configuration are explained in detail below.

What differs from the data processing system 900b shown in FIG. 10 is that the storage apparatus 300c comprises a threshold value monitoring table 323c, a segment allocation program 324, and a table of correspondence volume and internal pool 325 in the memory 320, and a TP pool 360c and internal pools 365, 366.

FIG. 16 is a diagram showing the threshold value management table 323c. The threshold value management table 323c, in addition to the threshold value monitoring table 323 explained in second embodiment, is added with an switching path column 3235 for storing information of the switching path for each pool allocated volume. The pool ID column 3230 is changed to the internal pool ID column 3230c for identifying the internal pools 365, 366.

The internal pools 365, 366 are volume groups virtually existing in the TP pool. A segment allocated to the virtual volume is allocated from the volumes contained in the internal pools 365, 366. The internal pools 365, 366 are recognized only by the storage apparatus 300c.

The TP pool 360c, unlike the TP pools of the second embodiment, is configured from one pool. Here, the administrator will be freed from the burden of selecting a designation target TP pool upon creating the virtual volume. A plurality of internal pools having the same level of reliability are contained in the TP pool 360c.

The segment allocation program 324 is a program for allocating a segment, which is a storage area, from the internal pools 365, 366 existing in the TP pool 360c to the virtual volume when a data write command for writing data into the virtual volume is issued.

FIG. 17 is a diagram showing the table of correspondence volume and internal pool 325. The table of correspondence volume and internal pool 325 shows the relationship of the virtual volume, and the internal pool for allocating a segment to the virtual volume. As shown in FIG. 17, the volume correspondence table 325 includes a volume ID column 3250 and an internal pool ID column 3251. The volume ID column 3250 is a column for storing the volume ID, and the internal pool ID column 3251 is a column for storing the internal pool ID.

The segment allocation program 324 refers to the table of correspondence volume and internal pool 325 to select an internal pool having an switching path with reliability (redundancy) that is greater than the reliability (redundancy) of the volume path between the host computer 100 and the storage system (management server 200b, storage apparatuses 300c, 400, switch 500), and the relationship of the virtual volume and the internal pool is thereby associated.

The processing to be executed in the data processing system 900c is now explained. Since the processing to be executed in the data processing system 900c is for the most part the same as the processing to be executed in the data processing system 900b of the second embodiment, only the sections where different processing is to be performed are explained. When comparing the processing of the second embodiment and the processing of this embodiment, the pool creation processing has been partially changed, and the path allocation processing and the segment allocation processing are different.

The processing to be executed in the data processing system 900c is now explained with reference to FIG. 18, FIG. 19 and FIG. 20.

Figure 18:
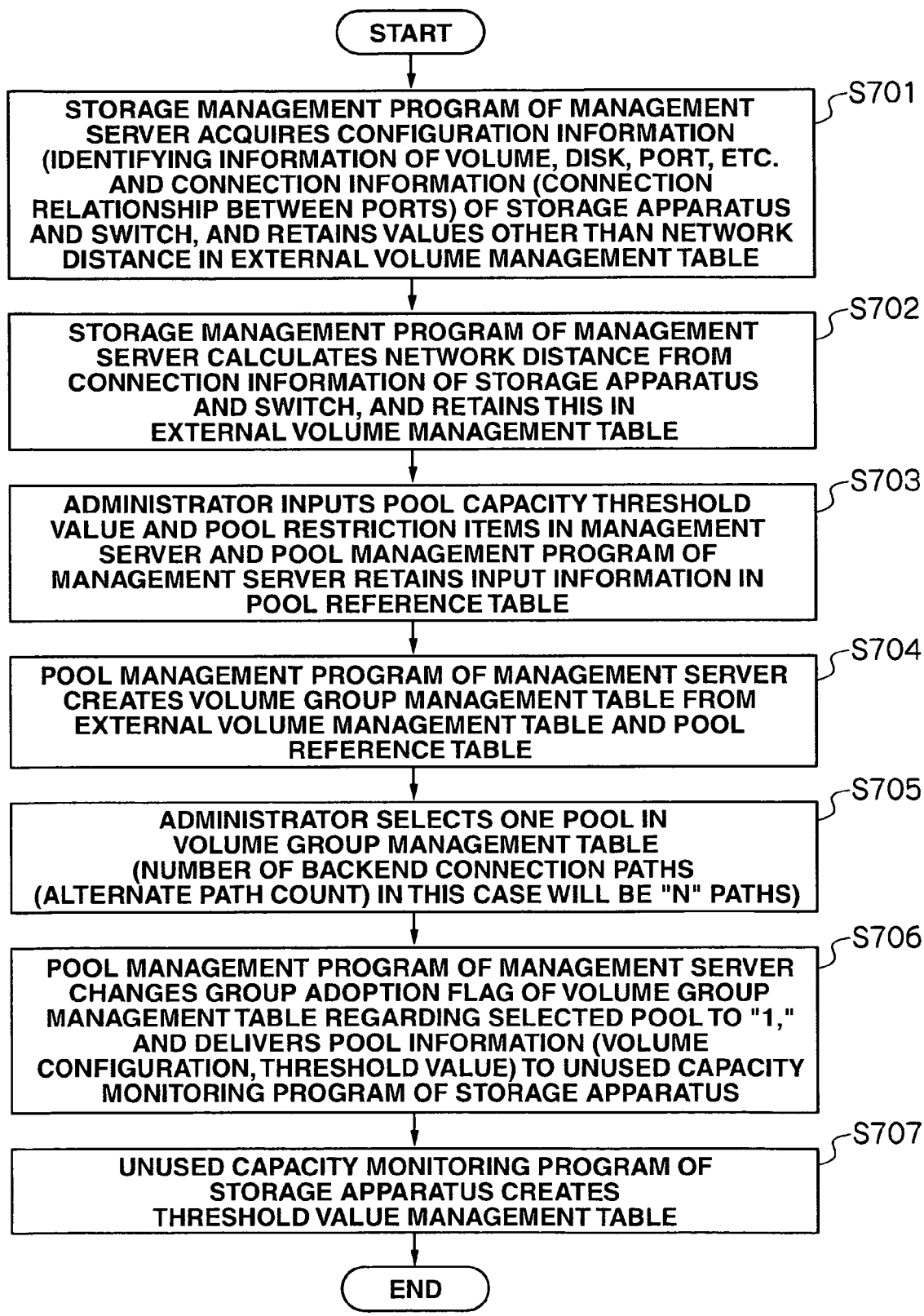
FIG. 18 is a diagram showing the outline of the TP pool creation processing according to the third embodiment.

FIG. 18 is a flowchart showing the pool creation processing in the third embodiment. In FIG. 18, since the processing from steps S701 to S705 is each the same as the processing of steps S501 to S505 of the pool creation processing and the path allocation processing explained with reference to FIG. 13 in the second embodiment, the explanation thereof is omitted.

At step S706, the pool management program 222 of the management server 200b changes the group adoption flag 2263 of the volume group management table 226 concerning the selected pool to "1," and delivers the information (volume configuration, threshold value and switching path) of the pool to the unused capacity monitoring program 322 of the storage apparatus 300.

Since the processing at step S707 is the same as the processing at step S507 of the second embodiment, the explanation thereof is omitted.

Figure 19:
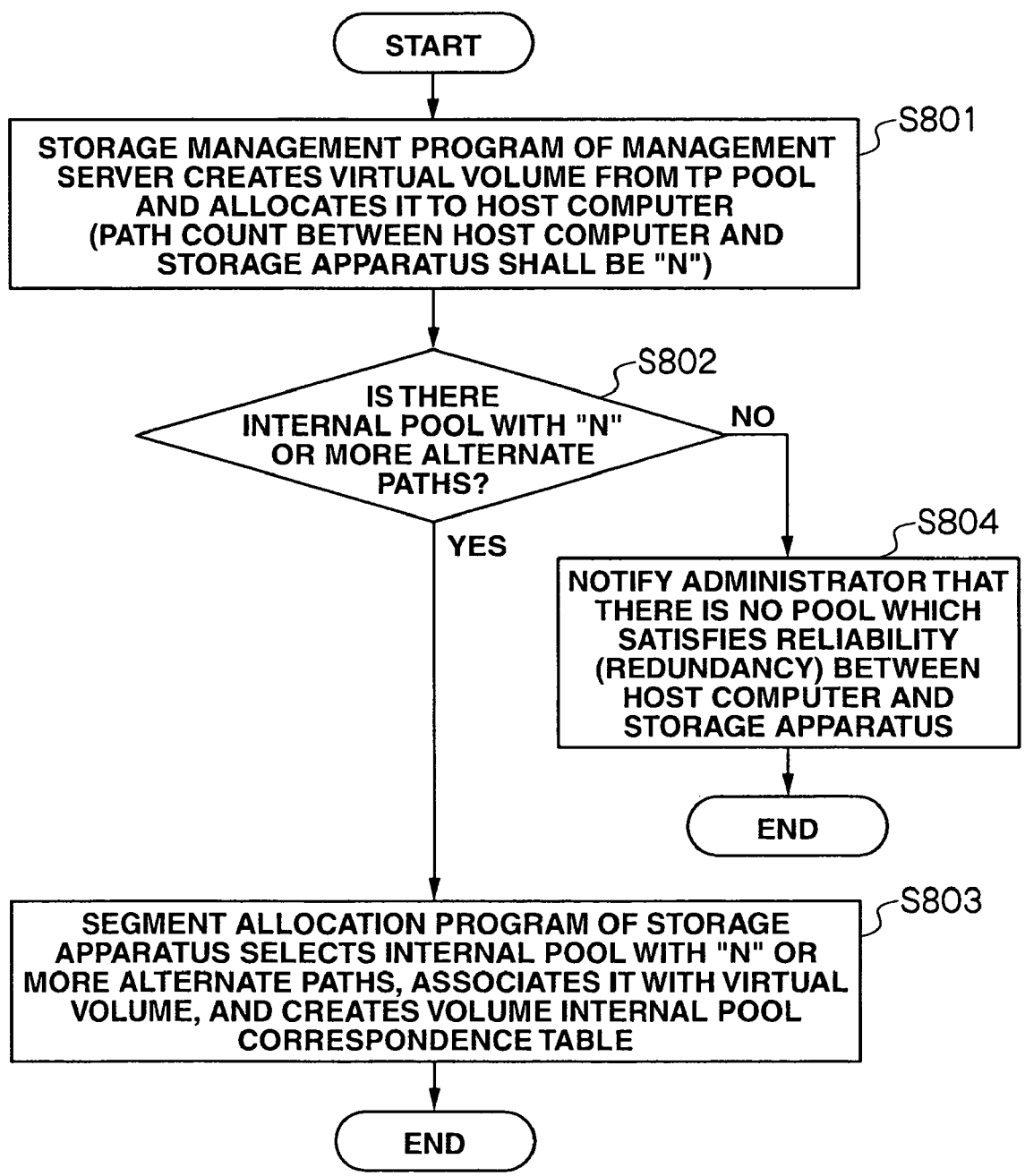
FIG. 19 is a diagram showing an example of the path allocation processing according to the third embodiment.

FIG. 19 is a flowchart showing the path allocation processing in the third embodiment.

At step S801, the storage management program 221 of the management server 200 creates the virtual volume 370 from the TP pool 360c, and allocates this to the host computer 100 (number of paths between the host computer 100 and the storage apparatus 300c shall be "N").

At step S802, storage management program 221 of the management server 200b checks whether there is an internal pool having "N" or more switching paths. If there is a pool that corresponds to this condition, the routine proceeds to the processing at step S803, and, if there is no pool that corresponds to this condition, the routine proceeds to the processing at step S804.

At step S803, the segment allocation program 324 of the storage apparatus 300 selects an internal pool having "N" or more switching paths, associates such internal pool with the virtual volume, and creates the table of correspondence volume and internal pool 325.

At step S804 the storage management program 221 of the management server 200b notifies the administrator that there is no TP pool having reliability (redundancy) that is of the same level as or higher than the reliability (redundancy) between the host computer 100 and the storage system 300c.

Figure 20:
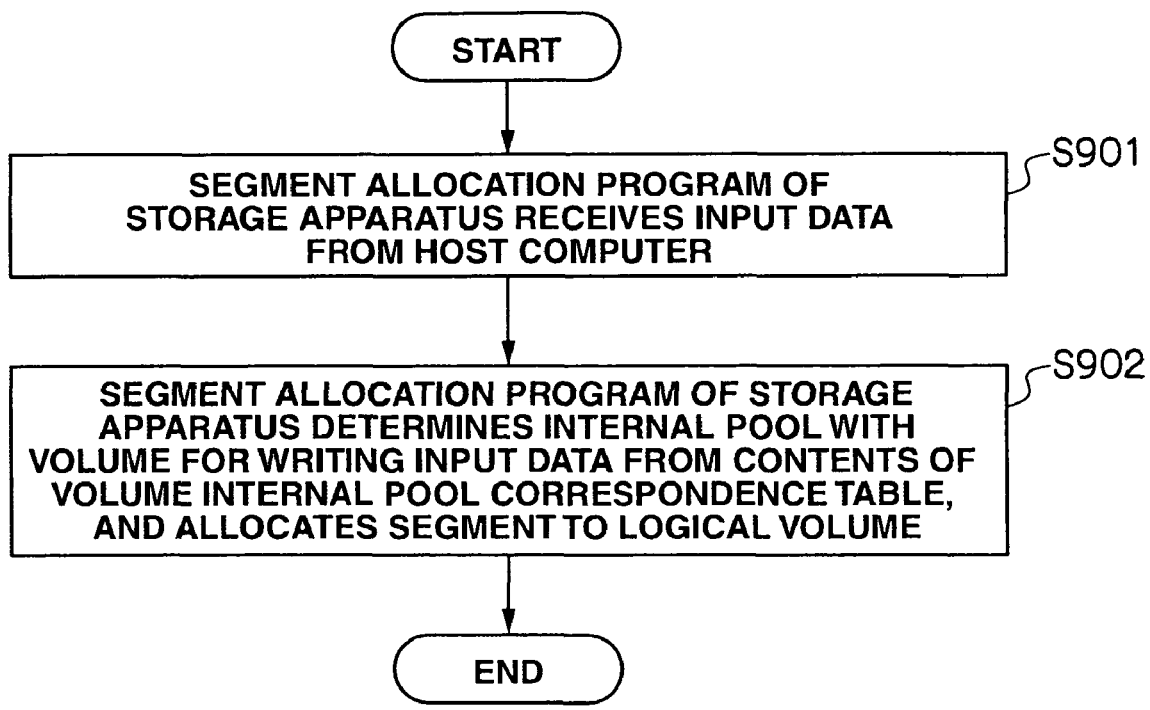
FIG. 20 is a diagram showing an example of the segment allocation processing according to the third embodiment.

FIG. 20 is a flowchart showing segment allocation processing in the third embodiment.

At step S901, the segment allocation program 324 of the storage apparatus 300c receives input data from the host computer 100.

At step S902, the segment allocation program 324 of the storage apparatus 300c determines the internal pool having a volume to which the input data is to be input from the contents of the table of correspondence volume and internal pool 325, and allocates a segment to that virtual volume.

According to the foregoing processing, the storage system 900c is able to create a TP pool and allocate volumes to the host computer upon giving consideration to the backend connection configuration and redundancy upon allocating an externally connected volume to the TP pool. In addition, the administrator will be able to create virtual volumes without having to be aware of the type or reliability of the TP pool.

The present invention can be broadly applied to data processing systems and their storage area allocation methods.

What is claimed is:

1. A data processing system, comprising:
a first storage apparatus;
a second storage apparatus that uses the first storage apparatus as an external storage area;
at least one or more host computers;
at least one or more switches for connecting the first storage apparatus, the second storage apparatus, and the host computer; and
a management server for managing the first storage apparatus, the second storage apparatus, and the switches;
wherein the first storage apparatus includes one or more physical devices, and a first storage area configured from the one or more physical devices;
wherein the second storage apparatus includes one or more physical devices, an external device management unit that sets the first storage area as an external storage area and uses the external storage area as a virtual device, and a storage pool configured from a second storage area configured from the one or more physical devices and the first storage area; and
wherein the data processing system further comprises:
a creation unit for determining the reliability of the second storage area based on connection information between the first storage area and the second storage area, classifying the first and the second storage areas based on the reliability, and creating the storage pool in the second storage apparatus; and
a provision unit for creating a path between the host computer and the second storage apparatus so as to guarantee the same level of reliability as the reliability of the respective storage pools, and providing the second storage area to the host computer.

2. The data processing system according to claim 1, wherein, upon classifying the first and the second storage areas and creating the storage pool, the storage pool is created with the attributes of the one or more physical devices of the first storage apparatus and the configuration condition of the overall data processing system as the constrained condition.

3. The data processing system according to claim 1, wherein a distance of a network between the first storage area and the second storage area is used as a criterion for determining the reliability of the second storage area.

4. The data processing system according to claim 1, wherein the redundancy of a network path between the first storage area and the second storage area is used as a criterion for determining the reliability of the second storage area.

5. The data processing system according to claim 1, wherein the second storage apparatus includes an expansion unit for expanding the second storage area; and
wherein the provision unit expands the second storage area with the expansion unit and provides the second storage area to the host computer.

6. The data processing system according to claim 5, wherein, when the creation unit is to classify the first and the second storage areas and create the storage pool, the storage pool is created with the attributes of the one or more physical devices of the first storage apparatus and the configuration condition of the overall data processing system as the constrained condition.

7. The data processing system according to claim 5, wherein a distance of a network between the first storage area and the second storage area is used as a criterion for determining the reliability of the second storage area.

8. The data processing system according to claim 5, wherein the redundancy of a network path between the first storage area and the second storage area is used as a criterion for determining the reliability of the second storage area.

9. A storage area allocation method of a data processing system comprising a first storage apparatus; a second storage apparatus that uses the first storage apparatus as an external storage area; at least one or more host computers; at least one or more switches for connecting the first storage apparatus, the second storage apparatus, and the host computer; and a management server for managing the first storage apparatus, the second storage apparatus, and the switches;
wherein the first storage apparatus includes one or more physical devices, and a first storage area configured from the one or more physical devices;
wherein the second storage apparatus includes one or more physical devices, an external device management unit that sets the first storage area as an external storage area and uses the external storage area as a virtual device, and a storage pool configured from a second storage area configured from the one or more physical devices and the first storage area; and
wherein the data processing system:
determines the reliability of the second storage area based on connection information between the first storage area and the second storage area, classifies the first and the second storage areas based on the reliability, and creates the storage pool in the second storage apparatus; and
creates a path between the host computer and the second storage apparatus so as to guarantee the same level of reliability as the reliability of the respective storage pools, and provides the second storage area to the host computer.

10. The storage area allocation method according to claim 9, wherein, upon classifying the first and the second storage areas and creating the storage pool, the storage pool is created with the attributes of the one or more physical devices of the first storage apparatus and the configuration condition of the overall data processing system as the constrained condition.

11. The storage area allocation method according to claim 9, wherein a distance of a network between the first storage area and the second storage area is used as a criterion for determining the reliability of the second storage area.

12. The storage area allocation method according to claim 9, wherein the redundancy of a network path between the first storage area and the second storage area is used as a criterion for determining the reliability of the second storage area.

13. The storage area allocation method according to claim 9, wherein the second storage area is provided by the second storage apparatus after the second storage apparatus expands the second storage area.

14. The storage area allocation method according to claim 13, wherein, upon classifying the first and the second storage areas and creating the storage pool, the storage pool is created with the attributes of the one or more physical devices of the first storage apparatus and the configuration condition of the overall data processing system as the constrained condition.

15. The storage area allocation method according to claim 13, wherein a distance of a network between the first storage area and the second storage area is used as a criterion for determining the reliability of the second storage area.

16. The storage area allocation method according to claim 13, wherein the redundancy of a network path between the first storage area and the second storage area is used as a criterion for determining the reliability of the second storage area.

17. A management server for managing a first storage apparatus, a second storage apparatus, and at least one or more switches in a data processing system comprising the first storage apparatus; the second storage apparatus that uses the first storage apparatus as an external storage area; at least one or more host computers; and the switches for connecting the first storage apparatus, the second storage apparatus, and the host computer;

wherein the first storage apparatus includes one or more physical devices, and a first storage area configured from the one or more physical devices;

wherein the second storage apparatus includes one or more physical devices, an external device management unit that sets the first storage area as an external storage area and uses the external storage area as a virtual device, and a storage pool configured from a second storage area configured from the one or more physical devices and the first storage area; and wherein the management server comprises:

a creation unit for determining the reliability of the second storage area based on connection information between the first storage area and the second storage area, classifying the first and the second storage areas based on the reliability, and creating the storage pool in the second storage apparatus; and a provision unit for creating a path between the host computer and the second storage apparatus so as to guarantee the same level of reliability as the reliability of the respective storage pools, and providing the second storage area to the host computer.

18. The management server according to claim 17, wherein, upon classifying the first and the second storage areas and creating the storage pool, the storage pool is created with the attributes of the one or more physical devices of the first storage apparatus and the configuration condition of the overall data processing system as the constrained condition.

19. The management server according to claim 17, wherein a distance of a network between the first storage area and the second storage area is used as a criterion for determining the reliability of the second storage area.

20. The management server according to claim 17, wherein the redundancy of a network path between the first storage area and the second storage area is used as a criterion for determining the reliability of the second storage area.

* * * * *